(12) United States Patent
Murayama et al.

(10) Patent No.: US 6,773,789 B2
(45) Date of Patent: Aug. 10, 2004

(54) MAGNETIC RECORDING MEDIUM

(75) Inventors: Yuichiro Murayama, Kanagawa (JP); Hiroshi Hashimoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 87 days.

(21) Appl. No.: 10/283,096

(22) Filed: Oct. 30, 2002

(65) Prior Publication Data

US 2003/0096139 A1 May 22, 2003

(30) Foreign Application Priority Data

Oct. 31, 2001 (JP) .................................... P.2001-334528

(51) Int. Cl.⁷ .............................. B32B 1/00; D06N 7/04
(52) U.S. Cl. ..................... 428/141; 428/216; 428/336; 428/694 BC; 428/694 BS; 428/694 BR
(58) Field of Search ................................ 428/141, 216, 428/336, 694 BC, 694 BS, 694 BR

(56) References Cited

U.S. PATENT DOCUMENTS

| | | | | |
|---|---|---|---|---|
| 4,443,490 A | * | 4/1984 | Nakajima et al. | 427/500 |
| 4,576,866 A | * | 3/1986 | Okita et al. | 428/336 |
| 4,657,817 A | * | 4/1987 | Okita et al. | 428/425.9 |
| 4,672,002 A | * | 6/1987 | Okita et al. | 428/425.9 |
| 5,153,071 A | * | 10/1992 | Watanabe et al. | 428/425.9 |

FOREIGN PATENT DOCUMENTS

| | | | |
|---|---|---|---|
| JP | 57-40747 A | | 3/1982 |
| JP | 58-146023 A | | 8/1983 |
| JP | 60-133529 A | | 7/1985 |
| JP | 60-133530 A | | 7/1985 |
| JP | 60-150227 A | | 8/1985 |
| JP | 61-13430 A | | 1/1986 |
| JP | 62-42326 | * | 2/1987 |
| JP | 5-57647 A | | 8/1993 |

* cited by examiner

*Primary Examiner*—Stevan A. Resan
(74) *Attorney, Agent, or Firm*—Sughrue Mion, PLLC

(57) ABSTRACT

A magnetic recording medium is disclosed, comprising an undercoat layer formed by a radiation-curing resin provided on a support and at least magnetic layer containing a ferromagnetic powder and a binder provided thereon, wherein the radiation-curing resin is a compound having an alicyclic structure and two or more radiation-curing functional groups per molecule, the undercoat layer is a radiation-cured layer, the magnetic layer has a thickness of from 0.05 μm to 2.0 μm and the number of protrusions having a height of from 10 nm to 20 nm as measured by an atomic force microscope (AFM) is from 5 to 1,000 per 100 μm² of the surface of the magnetic layer.

13 Claims, No Drawings

MAGNETIC RECORDING MEDIUM

FIELD OF THE INVENTION

The present invention relates to a magnetic recording medium comprising at least a magnetic layer provided on a support which exhibits excellent electromagnetic characteristics and durability.

BACKGROUND OF THE INVENTION

As tape-like magnetic recording media (i.e., magnetic recording particulate media) for audio, video and computer and disc-like magnetic recording media such as floppy disc there are-used magnetic recording media comprising a magnetic layer having a ferromagnetic powder such as γ-iron oxide, Co-containing iron oxide, chromium oxide and ferromagnetic metal powder dispersed in a binder. As the support to be used in these magnetic recording media there is normally used a polyethylene terephthalate, polyethylene naphthalate or the like. These support materials are stretched to have a high crystallinity that enhances the mechanical strength and an excellent solvent resistance thereof.

A magnetic layer obtained by applying a coating solution having a ferromagnetic powder dispersed in a binder to a support has a high packing degree of ferromagnetic powder and hence a small elongation at break and thus is brittle. Therefore, such a magnetic layer formed without interposition of undercoat layer can easily break and be peeled off from the support when given a mechanical force. In order to eliminate these troubles, it has been practiced to provide an undercoat layer on the support, allowing the magnetic layer to be adhered to the support firmly.

For example, it is known that a compound having a functional group which cures when irradiated with electron ray, i.e., radiation-curing compound is used to form an undercoat layer.

For example, Japanese Patent (Application) Laid-Open No. 133529/1985, Japanese Patent Laid-Open No. 133530/1985, Japanese Patent Laid-Open No. 150227/1985 and Japanese Patent Publication No. 57647/1993 disclose a magnetic recording medium comprising an undercoat layer formed by a bifunctional aliphatic compound as a radiation-curing compound. The hardened layer of such an aliphatic compound exhibits a glass transition temperature of about 40° C. at highest and thus is disadvantageous in that adhesion can occur at the coating step after the coating of the undercoat layer.

On the other hand, such an aliphatic radiation-curing compound can be provided with an increased number of (meth)acryloyl functional groups to prevent adhesion. However, the aliphatic radiation-curing compound having a polyfunctionality undergoes more hardening shrinkage, making it impossible to obtain a smooth coat layer. Such an aliphatic radiation-curing compound exhibits a deteriorated adhesion to a support material such as polyethylene terephthalate (PET) and polyethylene naphthalate (PEN), making it impossible to obtain sufficient running durability or electromagnetic characteristics.

Further, Japanese Patent (Application) Laid-Open No. 13430/1986 and Japanese Patent Laid-Open No. 146023/1983 disclose an examples of electron radiation-curing compounds having a cyclic structure. Japanese Patent Laid-Open No. 13430/1986 uses an electron radiation-curing compound made of phthalic acid and polyether polyol. Japanese Patent Laid-Open No. 146023/1983 uses a product of reaction of a diisocyanate compound with a compound having an electron radiation-curing functional group and a group reactive with isocyanate. A diisocyanate compound has an aromatic ring such as tolylene diisocyanate. Such a diisocyanate compound having an aromatic ring forms a hardened coat layer which can easily be brittle and thus exhibits an insufficient adhesion to the support, making it easy for the magnetic coat layer to fall off to disadvantage.

In recent years, a reproduction head employing MR (magneto resistivity) as an operational principle has been proposed. Such a reproduction head has been used in hard disc, etc. Japanese Patent Laid-Open No. 227517/1996 proposes the application of such a reproduction head to magnetic tape. Since such an MR head can give a reproduced output of several times higher than induction type magnetic head and requires no induction coil, device noises such as impedance noise can be drastically lowered, making it possible to lower the generation of noises in the magnetic recording medium and obtain a great SN ratio. In other words, when the noise of magnetic recording medium which has heretofore been concealed in device noise can be lowered, recording/reproduction can be fairly conducted, making it possible to drastically improve the high density recording characteristics of the magnetic recording medium.

However, the MR head generates noises (thermal noises) when affected by minute heat. In particular, when the MR head comes in contact with protrusions on the surface of the magnetic layer, the resulting effect causes sudden and continuous rise of noise. In the case of digital recording, this trouble is so drastic that error correction is made impossible. This problem of thermal noise is remarkable particularly with a magnetic recording medium for a system for reproducing a recorded signal having a recording density of not smaller than 0.5 Gbit/inch$^2$.

In order to lessen such a thermal noise, it is important to control the surface conditions of the magnetic layer. Thus, a desirable means for this purpose has been desired.

SUMMARY OF THE INVENTION

An object of the present invention is to provide a magnetic recording medium excellent in running durability as well as in coating layer smoothness and electromagnetic characteristics.

The present invention relates to a magnetic recording medium comprising an undercoat layer formed by a radiation-curing resin provided on a support and at least magnetic layer containing a ferromagnetic powder and a binder provided thereon, wherein the radiation-curing resin is a compound having an alicyclic structure and two or more radiation-curing functional groups per molecule, the undercoat layer is a radiation-cured layer, the magnetic layer has a thickness of from 0.05 μm to 2.0 μm and the number of protrusions having a height of from 10 nm to 20 nm as measured by an atomic force microscope (AFM) is from 5 to 1,000 per 100 μm$^2$ of the surface of the magnetic layer.

A preferred embodiment of the present invention is as follows.

1) The magnetic recording medium as defined above, wherein the alicyclic structure is one formed by a plurality of rings having atoms in common.

DETAILED DESCRIPTION OF THE INVENTION

The radiation-curing resin to be used in the present invention is a compound having an alicyclic structure and two or more radiation-curing functional groups per molecule and is incorporated in at least the undercoating solution for forming the undercoat layer.

When given a radiation energy such as electron ray and ultraviolet ray, the radiation-curing resin to be used herein undergoes polymerization or crosslinking to polymer that causes hardening thereof. The radiation-curing resin doesn't undergo reaction unless given such an energy. Therefore, the coating solution containing such a radiation-curing resin exhibits a stabilized viscosity so far as it is not irradiated with radiation and thus can provide a coating layer having a high smoothness. Further, since the coating solution containing such a radiation-curing resin undergoes is a moment reaction when given a high radiation energy, the resulting coating layer can be provided with a high strength.

This is because the radiation-curing resin has a viscosity as relatively low as few mPa·s to 200 mPa·s and thus can provide an undercoat layer that exerts a leveling effect of shielding protrusions on the support to form a smooth support. It can be thought that the application of a magnetic solution to the undercoat layer makes it possible to provide a magnetic layer having an excellent surface smoothness and hence a magnetic recording medium having excellent electromagnetic characteristics. This effect can be remarkably exerted particularly on a magnetic layer having a thickness as relatively small as from 0.05 $\mu$m to 2.0 $\mu$m, making it possible to improve the smoothness of the coat layer, particularly lessen fine protrusions on the surface of the magnetic layer that can cause noises in magnetic recording using MR head with the recent trend toward enhancement of recording density.

Moreover, since the radiation-curing resin has an alicyclic structure and thus has a higher glass transition temperature than conventional aliphatic resins, the resulting undercoat layer causes no adhesion. Further, since the radiation-curing resin has an alicyclic skeleton such as cyclohexane ring, bicyclo ring, tricyclo ring and spiro ring, the resulting undercoat layer undergoes little shrinkage due to hardening and has a high adhesion to the support and hence an excellent running durability.

The aforementioned radiation-curing resin preferably has a molecular weight of from 200 to 1,000, more preferably from 200 to 500.

The aforementioned radiation-curing resin preferably has a viscosity of from 5 to 200 mPa·s, more preferably from 5 to 100 mPa·s at 25° C.

Examples of the radiation-curing resin employable herein include acrylic acid esters, acrylamides, methacrylic acid esters, methacrylic acid amides, allyl compounds, vinyl ethers, and vinylesters. Preferred among these radiation-curing resins are acrylic acid esters and methacrylic acid esters. Particularly preferred among these radiation-curing resins are radiation-curing functional groups, i.e., acrylic acid esters having two acryloyl groups.

The radiation-curing resin to be used herein has an alicyclic structure. The alicyclic structure has a skeleton such as cyclo skeleton, bicyclo skeleton, tricyclo skeleton, spiro skeleton and dispiro skeleton. Particularly preferred among these skeletons are structures made of a plurality of rings having atoms in common such as those having skeletons, e.g., bicyclo skeleton, tricyclo skeleton, spiro skeleton and dispiro skeleton.

Examples of these skeletons include residues such as polyol and polyamine for forming radiation-curing resin such as ester and amide. The radiation-curing resin has radiation-curing functional groups bonded to these residues.

Specific examples of the radiation-curing resin employable herein include cyclopropane diacrylate, cyclopentane diacrylate, cyclohexane diacrylate, cyclobutane diacrylate, dimethylol cyclopropane diacrylate, dimethylol cyclopentane diacrylate, dimethylol cyclohexane diacrylate, dimethylol cyclobutane diacrylate, cyclopropane dimethacrylate, cyclopentane dimethacrylate, cyclohexane dimethacrylate, cyclobutane dimethacrylate, dimethylol cyclopropane dimethacrylate, dimethylol cyclopentane dimethacrylate, dimethylol cyclohexane dimethacrylate, dimethylol cyclobutane dimethacrylate, bicyclobutane diacrylate, bicyclooctane diacrylate, bicyclononane diacrylate, bicycloundecane diacrylate, dimethylol bicyclobutane diacrylate, dimethylol bicyclooctane diacrylate, dimethylol bicyclononane diacrylate, dimethylol bicycloundecane diacrylate, bicyclobutane dimethacrylate, bicyclooctane dimethacrylate, bicyclononane dimethacrylate, bicycloundecane dimethacrylate, dimethylol bicyclobutane dimethacrylate, dimethylol bicyclooctyl dimethacrylate, dimethylol bicyclononane dimethacrylate, dimethyl bicycloundecane dimethacrylate, tricycloheptane diacrylate, tricyclodecane diacrylate, tricyclododecane diacrylate, tricycloundecane diacrylate, tricyclotetradecane diacrylate, tricyclodecane tridecane diacrylate, dimethylol tricycloheptane diacrylate, dimethylol tricyclodecane diacrylate, dimethylol tricyclododecane diacrylate, dimethylol tricycloundecane diacrylate, dimethylol tricyclotetradecane diacrylate, dimethylol tricyclodecane tridecane diacrylate, tricycloheptane dimethacrylate, tricyclodecane dimethacrylate, tricyclododecane dimethacrylate, tricycloundecane dimethacrylate, tricyclotetradecane dimethacrylate, tricyclodecane tridecane dimethacrylate, dimethylol tricycloheptane dimethacrylate, dimethylol tricyclodecane dimethacrylate, dimethylol tricyclododecane dimethacrylate, dimethylol tricycloundecane dimethacrylate, dimethylol tricyclotetradecane dimethacrylate, dimethylol tricyclodecane tridecane dimethacrylate, spirooctane diacrylate, spiroheptane diacrylate, spirodecane diacrylate, cyclopentanespirocyclobutane diacrylate, cyclohexanespiro cyclopenane diacrylate, spirobicyclohexane diacrylate, dispiroheptadecane diacrylate, dimethylolspirooctane diacrylate, dimethylolspiroheptane diacrylate, dimethylolspirodecane diacrylate, dimethylolcyclopentanespirobutane diacrylate, dimethylolcyclohexanespirocyclopentane diacrylate, dimethylolspirobicyclohexane diacrylate, dimethyloldispiroheptadecane diacrylate, spirooctane dimethacrylate, spirooctane dimethacrylate, spiroheptane dimethacrylate, spirodecane dimethacrylate, cyclopentanespirocyclobutane dimethacrylate, cyclohexanespirocyclopentane dimethacrylate, spirobicyclohexane dimethacrylate, dispiroheptadecane dimethacrylate, dimethylolspirooctane dimethacrylate, dimethylolspiroheptane dimethacrylate, dimethylolspirodecane dimethacrylate, dimethylolcyclopentanespirocyclobutane dimethacrylate, dimethylolcyclohexanespirocyclopentane dimethacrylate, dimethylolspirobicyclohexane dimethacrylate, and dimethyloldispiroheptadecane dimethacrylate.

Preferred among these radiation-curing resins are dimethyloltricyclodecane diacrylate, dimethylolbicyclooctane diacrylate, and dimethylolspirooctane diacrylate.

Particularly preferred among these radiation-curing resins is dimethyloltricyclodecane diacrylate. Specific examples of commercially available radiation-curing resins include KAYARAD R-684 (produced by NIPPON KAYAKU CO., LTD.), Light Acrylate DCP-A (produced by KYOEISHA CHEMICAL CO.,LTD), and LUMICURE DCA-200 (produced by DAINIPPON INK & CHEMICALS, INC.).

The undercoating agent may comprise other radiation-curing compounds incorporated therein besides the aforementioned radiation-curing resin. Examples of these compounds to be used in combination with the aforementioned radiation-curing resin include monofunctional acrylate compounds and methacrylate compounds. These compounds may be used as reactive diluents. A reactive diluent acts to adjust the physical properties of the undercoating agent or the curing reaction of the undercoating agent.

A preferred structure of the compound to be used in combination with the aforementioned radiation-curing resin is a monofunctional acrylate compound having one radiation-curing functional group per molecule of the radiation-curing resin of the present invention. Specific examples of the monofunctional acrylate compound include cyclohexyl (meth)acrylate, isobonyl (meth)acrylate, and tetrahydrofurfuryl (meth)acrylate. The term "(meth)acrylate" as used herein means to include methacrylate and acrylate.

The amount of the compound to be used in combination with the radiation-curing resin is preferably from 10% to 100% by weight based on the amount of the radiation-curing resin.

The undercoating agent containing the radiation-curing resin may be used in the form of solution in a solvent as necessary. The undercoating agent preferably has a viscosity of from 5 to 200 mPa·s. Examples of the solvent employable herein include methyl ethyl ketone (MEK), methanol, ethanol, and toluene.

The undercoating agent is applied to a support, dried, and then irradiated with radiation to cure. The undercoat layer thus cured preferably has a glass transition temperature Tg of from 80° C. to 150° C., more preferably from 100° C. to 130° C. When Tg of the undercoat layer is less than 80° C., the undercoat layer causes adhesion at the coating step. On the contrary, when Tg of the undercoat layer exceeds 150° C., the resulting coat layer can be brittle.

The undercoat layer preferably has a thickness of from 0.1 $\mu$m to 1.0 $\mu$m, more preferably from 0.5 $\mu$m to 0.7 $\mu$m. When the thickness of the undercoat layer is less than 0.1 $\mu$m, the undercoat layer cannot be easily provided with a sufficient smoothness. On the contrary, when the thickness of the undercoat layer is more than 1.0 $\mu$m, the coat layer can be difficultly dried, causing adhesion.

As the support on which the undercoat layer is provided there may be used any known support material such as biaxially-oriented polyethylene terephthalate, polyethylene naphthalate, polyamide (aromatic, aliphatic, etc.) and polyamideimide (aromatic, aliphatic, etc.). Preferred examples of these support materials include polyethylene terephthalate, polyethylene naphthalate, and polyamide.

These support materials may be previously subjected to corona discharge treatment, plasma treatment, easy adhesion treatment, heat treatment or the like.

The average central plane surface roughness (defined in JIS B 0601) of the support is preferably from 3 nm to 10 nm at a cut-off value of 0.25 mm.

The undercoating agent which has been applied to the support and dried is then irradiated with radiation.

As the radiation to be used in the present invention there may be used electron ray or ultraviolet ray as mentioned above. In the case where ultraviolet ray is used, it is necessary that the undercoating agent comprise a photopolymerization initiator incorporated therein. Electronic radiation curing is preferably effected because no polymerization initiator is required and the resulting depth of penetration is great.

As an electron ray accelerator there may be used a scanning type electron ray accelerator, double scanning type electron ray accelerator or curtain beam type accelerator. Preferably, curtain beam type accelerator is used because it is relatively inexpensive and gives a great output. Referring to electron ray properties, the acceleration voltage is normally from 30 kV to 1,000 kV, preferably from 50 kV to 300 kV, and the absorbed dose is normally from 0.5 to 20 Mrad, preferably from 2 to 10 Mrad. When the acceleration voltage is lower than 30 kV, the transmission by energy is insufficient. On the contrary, when the acceleration voltage is higher than 300 kV, the efficiency of energy used in polymerization is lowered to economic disadvantage.

The atmosphere in which the undercoat layer is irradiated with electron ray is an oxygen concentration of not higher than 200 ppm attained by purging with nitrogen. When the oxygen concentration is too high, crosslinking and curing reaction in the vicinity of the surface of the undercoat layer is inhibited.

As the ultraviolet source there may be used a mercury vapor lamp. As the mercury vapor lamp there may be used a mercury vapor lamp having an output of from 20 to 240 W/cm. The mercury vapor lamp is used at a rate of 0.3 to 20 m/min. In general, the distance between the substrate and the mercury vapor lamp is preferably from 1 to 30 cm.

As the photopolymerization initiator to be used in ultraviolet curing there may be used a photoradical polymerization initiator. For the details of photoradical polymerization initiator, reference can be made to "Shinkobunshi Jikkengaku Dai 2-kan, Dai 6-sho, Hikari Hoshasen Jugo (New Institute of Polymer Experiment, Vol. 2, Chapter 5; Photo-radiation Polymerization)", Kyoritsu Shuppan, 1995, compiled by The Society of Polymer Science, Japan. Specific examples of the photoradical polymerization initiator include acetophenone, benzophenone, anthraquinone, benzoin ethylether, benzyl methyl ketal, benzyl ethyl ketal, benzoin isobutyl ketone, hydroxy dimethyl phenyl ketone, 1-hydroxycyclohexyl phenyl ketone, and 2-2-diethoxyacetophenone.

The mixing proportion of the photopolymerization initiator is normally from 0.5 to 20 parts by mass (i.e., by weight), preferably from 2 to 15 parts by mass, more preferably from 3 to 10 parts by mass.

For the details of radiation-curing device, radiation-curing conditions, etc., reference can be made to known devices and conditions disclosed in "UV·EB Kouka Gijutsu (UV/EB Curing Technique)", Extensive Technologies Service Co., Ltd., and "Teienerugi Denshisen Shoshano Oyo Gijutsu (Technique of Application of Irradiation with Low Energy Electron Ray), CMC Publishing Co., Ltd.

When the magnetic recording medium of the present invention is provided on the aforementioned undercoat layer, the number of protrusions having a height of from 10 nm to 20 nm as measured by an atomic force microscope (AFM) can be controlled to a range of from 5 to 1,000 per 100 $\mu m^2$ of the surface of the magnetic layer.

The height of protrusion as measured by an atomic force microscope (AFM) is defined by the height of protrusion from a central plane determined by the atomic force microscope (AFM) (plane having a volume surrounded by plane and roughened curved surface of magnetic layer which is equal from lower to upper portion and minimum) as a reference level.

Accordingly, the expression of "number of protrusions having a height of from 10 nm to 20 nm per 100 $\mu m^2$ of the surface of magnetic layer (hereinafter also referred to as "PN")" indicates the total number of protrusions having a height of from 10 to 20 nm from this reference level per 10 μm square, i.e., protrusion density. PN is more preferably from 5 to 100/100 μm². When PN is less than 5, the resulting magnetic recording medium exhibits a raised friction coefficient to disadvantage. On the contrary, when PN exceeds 100, the resulting magnetic recording medium has a lowered output, giving a tendency toward the increase of number of dropouts (DO).

The magnetic recording medium of the present invention is prepared by forming the aforementioned undercoat layer, and then forming a magnetic layer with the interposition of a non-magnetic lower layer or magnetic lower layer or directly on the undercoat layer. The undercoat layer may be provided on either or both sides of the support. The non-magnetic layer, magnetic lower layer or magnetic layer is formed by applying a composition having a non-magnetic powder or magnetic powder dispersed in a binder to the support.

Examples of the binder include polyurethane resin, polyester resin, polyamide resin, vinyl chloride resin, acrylic resin obtained by copolymerization of styrene, acrylonitrile and methylmethacrylate, cellulose resin such as nitrocellulose, epoxy resin, phenoxy resin, and polyvinyl alkyral resin such as polyvinyl acetal and polyvinyl butyral. These resins may be used singly or in admixture. Preferred among these resins are polyurethane resin, vinyl chloride resin, and acrylic resin. The binder preferably has a functional group (polar group) which is adsorbed by the surface of the magnetic and non-magnetic powders to enhance the dispersibility of the magnetic and non-magnetic powders. Preferred examples of the functional group include $-SO_3M$, $-SO_4M$, $-PO(OM)_2$, $-OPO(OM)_2$, $-COOM$, $R^1R^2NSO_3M$, $R^1R^2NRSO_3M$, $-NR^1R^2$, and $-N^+R^1R^2R^3X$. M represents a hydrogen atom or an alkaline metal such as sodium and potassium, R represents an alkylene group, and $R^1$, $R^2$ and $R^3$ each represent an alkyl group, hydroxyalkyl group or hydrogen atom. $R^1$ and $R^2$ may together form a ring. X represents a halogen such as chlorine and bromine. The content of the functional group in the binder is preferably from 10 μeq/g to 200 μeq/g, more preferably from 30 μeq/g to 120 μeq/g. When the content of the functional group falls outside the above defined range, the dispersibility of the magnetic or non-magnetic powder in the binder is deteriorated.

The binder is preferably provided with a functional group having an active hydrogen such as —OH group besides the adsorptive functional group to react with an isocyanate hardening agent, for forming a crosslinked structure that enhances the strength of the coat layer. The amount of such a functional group is preferably from 0.1 meq/g to 2 meq/g. The binder preferably has a weight-average molecular weight of from 10,000 to 200,000, more preferably from 20,000 to 100,000. When the weight-average molecular weight of the binder falls below the above defined range, the resulting coat layer has an insufficient coating strength and hence a deteriorated durability. On the contrary, when the weight-average molecular weight of the binder exceeds the above defined range, the dispersibility of the magnetic or non-magnetic powder in the binder is deteriorated.

For the details of polyurethane resin as a desired binder, reference can be made to Takaharu Iwata, "Poriuretan Jushi Handobukku (Handbook of Polyurethane Resins)", 1986, Nikkan Kogyo Shinbunsha. Such a polyurethane resin can be normally obtained by the addition polymerization of long-chain diol or short-chain diol (also referred to as "chain extender") with diisocyanate compound. As the long-chain diol there may be used a polyester diol, polyether diol, polyether ester diol, polycarbonate diol or polyolefin diol having a molecular weight of from 500 to 5,000. Long-chain diols are referred to as "polyester urethane", "polyether urethane", "polyether ester urethane", "polycarbonate urethane" or the like by the kind of long-chain polyol.

The polyester diol can be obtained by the polycondensation of aliphatic dibasic acid such as adipic acid, sebacic acid and azelaic acid or aromatic dibasic acid such as isophthalic acid, orthophthalic acid, terephthalic acid and naphthalenedicarboxylic acid with glycol. Examples of the glycol component employable herein include ethylene glycol, 1,2-propylene glycol, 1,3-propanediol, 1,4-butanediol, 1,5-pentanediol, 3-methyl-1,5-pentanediol, 1,6-hexanediol, 2,2-dimethyl-1,3-propanediol, 1,8-octanediol, 1,9-nonanediol, cyclohexanediol, cyclohexane dimethanol, and hydrogenated bisphenol A. Other examples of the polyester diol employable herein include polycaprolactone diol and polyvalerolactone diol obtained by subjecting lactone such as ε-caprolactone and γ-valerolactone, respectively, to ring-opening polymerization. The polyester diol preferably has a branched side chain or is obtained from an aromatic or alicyclic material from the standpoint of hydrolysis resistance.

Examples of the polyether diol employable herein include polyethylene glycol, polypropylene glycol, polytetramethylene glycol, and compounds obtained by the addition polymerization of aromatic glycol or alicyclic diol such as bisphenol A, bisphenol S, bisphenol P and hydrogenated bisphenol A with alkylene oxide such as ethylene oxide and propylene oxide.

A plurality of these long-chain diols may be used in combination or admixture. The short-chain diol can be selected from the same group of compounds as exemplified as the aforementioned glycol component of polyester diol. Further, a trifunctional or higher polyvalent alcohol such as trimethylolethane, trimethylolpropane and pentaerythritol can be used in a small amount in combination with the short-chain diol to obtain a polyurethane resin having a branched structure that lowers the viscosity of the solution or increase the terminal OH groups in the polyurethane, making it possible to enhance the hardenability of the coating solution with an isocyanate-based hardening agent.

Examples of the diisocyanate compound employable herein include aromatic diisocyanates such as MDI (diphenylmethane diisocyanate), 2,4-TDI (tolylene diisocyanate), 2,6-TDI, 1,5-NDI (naphthalene diisocyanate) and TODI (tolidine diisocyanate), and aliphatic or alicyclic diisocyanates such as transcyclohexane-1,4-diisocyanate, HDI (hexamethylene diisocyanate), IPDI (isophorone diisocyanate), $H_6XDI$ (hydrogenated xylylene diisocyanate) and $H_{12}MDI$ (hydrogenated diphenylmethane diisocyanate).

The proportion of long-chain diol, short-chain diol and diisocyanate in the polyurethane resin are preferably from 15% to 80% by mass (i.e., by weight), from 5% to 40% by mass and from 15% to 50% by mass, respectively. The concentration of urethane group in the polyurethane resin is preferably from 1 meq/g to 5 meq/g, more preferably from 1.5 meq/g to 5 meq/g. When the concentration of urethane group falls below the above defined range, the resulting polyurethane resin exhibits a reduced dynamic strength. On the contrary, when the concentration of urethane group exceeds the above defined range, the resulting polyurethane resin exhibits a raised solution viscosity and hence a deteriorated dispersibility. The polyurethane resin preferably has a glass transition temperature of from 0° C. to 200° C., more preferably from 40° C. to 160° C. When the glass transition temperature of the polyurethane resin falls below the above defined range, the resulting polyurethane resin exhibits a deteriorated durability. On the contrary, when the glass transition temperature of the polyurethane resin exceeds the above defined range, the resulting polyurethane resin exhibits a deteriorated caldenderability that deteriorates the electromagnetic characteristics of the magnetic recording medium. Examples of the method for introducing the aforementioned adsorptive functional group (polar group) into the polyurethane resin include a method involving the use of functional group as a monomer of long-chain diol, a method involving the use of functional group as a part of short-chain diol, and a method which comprises the production of polyurethane by polymerization, followed by polymer reaction causing the introduction of polar group.

As the vinyl chloride resin there may be used one obtained by the copolymerization of vinyl chloride monomer with various monomers. Examples of the copolymerizable monomers include aliphatic vinyl esters such as vinyl acetate and vinyl propionate, acrylates and methacrylates such as methyl (meth)acrylate, ethyl (meth)acrylate, isopropyl (meth) acrylate, butyl (meth)acrylate and benzyl (meth)acrylate, alkyl allyl ethers such as allyl methyl ether, allyl ethyl ether, allyl propyl ether and allyl butyl ether, styrene, α-methylstyrene, vinylidene chloride, acrylonitrile, ethylene, butadiene, and acrylamide. Examples of copolymerizable monomers having functional group include vinyl alcohol, 2-hydroxyethyl (meth)acrylate, polyethylene glycol (meth)acrylate, 2-hydroxypropyl (meth)acrylate, 3-hydroxypropyl (meth)acrylate, polypropylene glycol (meth)acrylate, 2-hydroxyethyl allyl ether, 2-hydroxypropyl allyl ether, 3-hydroxypropyl allyl ether, p-vinylphenol, maleic acid, maleic anhydride, acrylic acid, methacrylic acid, glycidyl (meth)acrylate, allyl glycidyl ether, phosphoethyl (meth)acrylate, sulfoethyl (meth)acrylate, p-styrenesulfonic acid, and sodium and potassium salts thereof. The term "(meth) acrylate" as used herein means one containing at least one of acrylate and methacrylate.

The proportion of the vinyl chloride monomer in the vinyl chloride resin is preferably from 60% to 95% by mass. When the proportion of the vinyl chloride monomer falls below the above defined range, the resulting vinyl chloride resin exhibits a reduced dynamic strength. On the contrary, when the proportion of the vinyl chloride monomer exceeds the above defined range, the resulting vinyl chloride resin exhibits a raised solution viscosity that deteriorates the dispersibility thereof. The preferred amount of the functional group for enhancing the hardenability of the adsorptive functional group (polar group) with a polyisocyanate-based hardening agent is as defined above. The introduction of these functional groups can be accomplished by the copolymerization of the aforementioned functional group-containing monomer or by the copolymerization of vinyl chloride-based resin, followed by polymer reaction causing the introduction of functional group. The polymerization degree is preferably from 200 to 600, more preferably from 240 to 450. When the polymerization degree falls below the above defined range, the resulting vinyl chloride resin exhibits a reduced dynamic strength. On the contrary, when the polymerization degree exceeds the above defined range, the resulting vinyl chloride resin exhibits a raised solution viscosity that deteriorates the dispersibility thereof.

In order to crosslink and harden the binder of the present invention, enhancing the dynamic strength or heat resistance of the coat layer, a hardening agent may be used. A preferred example of the hardening agent is a polyisocyanate compound. The polyisocyanate compound is preferably a trifunctional or higher polyisocyanate. Specific examples of the polyisocyanate include adduct type polyisocyanate compounds such as compound obtained by adding 3 mols of TDI (tolylene diisocyanate) to trimethylolpropane (TMP), compound obtained by adding 3 mols of HDI (hexamethylene diisocyanate) to TMP, adding 3 mols of IPDI (isophorone diisocyanate) to TMP and compound obtained by adding 3 mols of XDI (xylylene diisocyanate) to TMP, condensed isocyanurate type trimer of TDI, condensed isocyanurate pentamer of TDI, condensed isocyanurate heptamer of TDI, mixture thereof, isocyanurate type condensate of HDI, isocyanurate type condensate of IPDI, and crude MDI. Preferred among these polyisocyanates are compound obtained by adding 3 mols of TDI to TMP, and isocyanurate type trimer of TDI.

A hardening agent which cures when irradiated with radiation such as electron ray and ultraviolet ray may be used instead of isocyanate-based hardening agent. In some detail, a hardening agent having two or more, preferably three or more acryloyl groups or methacryloyl groups as radiation-curing functional groups per molecule may be used. Examples of such a hardening agent include triacrylate of TMP (trimethylolpropane), tetraacrylate of pentaerythritol, and urethane acrylate oligomer. In this case, (meth)acryloyl groups are preferably incorporated not only in the hardening agent but also in the binder. In the case of ultraviolet curing, a photosensitizer is used in combination with the hardening agent. The hardening agent is preferably added in an amount of from 0 to 80 parts by mass (i.e., by weight) based on 100 parts by mass (i.e., by weight) of the binder. When the amount of the hardening agent exceeds the above defined range, the dispersibility is deteriorated.

The ferromagnetic powder to be incorporated in the magnetic recording medium is made of ferromagnetic iron oxide, cobalt-containing ferromagnetic iron oxide or ferromagnetic alloy powder. The specific surface area ($S_{BET}$) of the ferromagnetic powder by BET method is normally from 40 to 80 m$^2$/g, preferably from 50 to 70 m$^2$/g. The crystallite size of the ferromagnetic powder is normally from 12 nm to 25 nm, preferably from 13 nm to 22 nm, particularly from 14 nm to 20 nm. The long axis length of the ferromagnetic powder is normally from 0.05 μm to 0.25 μm, preferably from 0.07 μm to 0.2 μm, particularly from 0.08 μm to 0.15 μm. Examples of the ferromagnetic metal powder include iron powder, nickel powder, Fe—Co powder, Fe—Ni powder, Co—Ni powder, and Co—Ni—Fe powder. An alloy comprising aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium or bismuth is incorporated therein in an amount of not greater than 20% by mass (i.e., by weight) based on the amount of the metallic components. The ferromagnetic metal powder may contain a small amount of water, hydroxide or oxide. The process for the preparation of such a ferromagnetic powder is already known. Thus, the ferromagnetic powder to be used herein can be produced by any known process. The form of the ferromagnetic powder is not specifically limited but is normally acicular, granular, dice-shaped, ellipsoidal or tabular. In particular, an acicular ferromagnetic powder is preferably used.

The aforementioned resin component, hardening agent and ferromagnetic powder are then kneaded and dispersed with a solvent such as methyl ethyl ketone, dioxane, cyclohexanone and ethyl acetate to be used in the preparation of magnetic layer coating solution to obtain a magnetic coating solution. The kneading/dispersion may be accomplished by any ordinary method. The magnetic recording medium of the present invention may have a non-magnetic undercoat layer made of a non-magnetic powder and a magnetic undercoat layer made of a magnetic powder. The non-magnetic powder can be selected from the group of inorganic compounds consisting of metal oxide, metal carbonate, metal sulfate, metal nitride, metal carbide and metal sulfide. As such inorganic compounds there may be used α-alumina having an α conversion of from 90% to 100%, β-alumina, γ-alumina, silicon carbide, chromium oxide, ceriumoxide, α-iron oxide, corundum, silicon nitride, titanium carbite, titanium oxide, silicon dioxide, tin oxide, magnesium oxide, tungsten oxide, zirconium oxide, boron nitride, zinc oxide, calciumoxide, calcium sulfate, barium sulfate and molybdenum disulfide, singly or in combination. Preferred among these inorganic compounds are titanium dioxide, zinc oxide, iron oxide and barium sulfate. Particularly preferred among these inorganic compounds are titanium dioxide and iron oxide. The average particle diameter of the non-magnetic powder is preferably from 0.005 µm to 2 µm. If necessary, non-magnetic powders having different average particle diameters maybe used in combination or a single non-magnetic powder having a wide particle diameter distribution may be used to exert the similar effect. In particular, the average particle diameter of the non-magnetic powder is preferably from 0.01 µm to 0.2 µm. It is particularly preferred that the pH value of the non-magnetic powder be from 6 to 9. The specific surface area of the non-magnetic powder is normally from 1 to 100 $m^2/g$, preferably from 5 to 50 $m^2/g$, more preferably from 7 to 40 $m^2/g$. The crystallite size of the non-magnetic powder is preferably from 0.01 µm to 2 µm. The DBP oil absorption amount of the non-magnetic powder is normally from 5 to 100 ml/100 g, preferably from 10 to 80 ml/100 g, more preferably from 20 to 60 ml/100 g. The specific gravity of the non-magnetic powder is normally from 1 to 12, preferably from 3 to 6. The form of the non-magnetic powder may be acicular, spherical, polyhedral or tabular.

The non-magnetic powder is preferably subjected to surface treatment so that $Al_2O_3$, $SiO_2$, $TiO_2$, $ZrO_2$, $SnO_2$, $Sb_2O_3$ or ZnO is present thereon. Preferred among these surface treating materials are $Al_2O_3$, $SiO_2$, $TiO_2$ and $ZrO_2$ from the standpoint of dispersibility. Particularly preferred among these surface treating materials are $Al_2O_3$, $SiO_2$ and $ZrO_2$. These surface treating materials may be used singly or in combination. A co-precipitated surface-treated layer may be used depending on the purpose. Alternatively, a method which comprises treating the non-magnetic powder with alumina, and then treating the surface layer with silica or vice versa may be employed. The surface-treated layer may be porous depending on the purpose but normally is preferably homogeneous and dense.

As the magnetic powder to be incorporated in the undercoat layer there may be used γ-$Fe_2O_3$, Co-modified γ-$Fe_2O_3$, alloy mainly composed of α-Fe, $CrO_2$ or the like. In particular, Co-modified γ-$Fe_2O_3$ is preferred. The ferromagnetic powder to be used in the undercoat layer of the present invention preferably has composition and properties different from that of the ferromagnetic powder to be incorporated in the upper magnetic layer. For example, in order to enhance the long wavelength recording characteristics of the magnetic layer, it is preferred that Hc of the lower magnetic layer be predetermined to be lower than that of the upper magnetic layer. Further, it is preferred that Br of the lower magnetic layer is predetermined to be higher than that of the upper magnetic layer to advantage. Moreover, a known multi-layer structure can be employed to advantage.

As the other additives to be incorporated in the magnetic layer or undercoat layer of the present invention there may be used materials having a lubricating effect, antistatic effect, dispersing effect, plasticizing effect or the like. Examples of these materials employable herein include molybdenum disulfide, tungsten disulfide, graphite, boron nitride, graphite fluoride, silicone oil, silicone having polar group, aliphatic acid-modified silicone, fluorine-containing silicone, fluorine-containing alcohol, fluorine-containing ester, polyolefin, polyglycol, alkylphosphoric acid ester and alkaline metal salt thereof, alkylsulfuric acid ester, alkaline metal salt thereof, polyphenyl ether, fluorine-containing alkylsulfuric acid ester and alkaline metal salt thereof, monobasic aliphatic acid which may have a $C_{10}$–$C_{24}$ unsaturated bond or may be branched and salt thereof with metal (e.g., Li, Na, K, Cu), monoaliphatic acid ester, dialiphatic acid ester or trialiphatic acid ester made of any one of monovalent, divalent, trivalent, tetravalent, pentavalent or hexavalent alcohol which may have a $C_{10}$–$C_{22}$ unsaturated bond or may be branched, alkoxy alcohol which may have a $C_{10}$–$C_{22}$ unsaturated bond or may be branched, monobasic aliphatic acid which may have a $C_{10}$–$C_{24}$ unsaturated bond or may be branched and monovalent, divalent, trivalent, tetravalent, pentavalent and hexavalent alcohol which may have a $C_2$–$C_{12}$ unsaturated bond or may be branched, aliphatic acid ester of monoalkyl ether of alkylene oxide polymer, $C_2$–$C_{22}$ aliphatic acid amide, and $C_8$–$C_{22}$ aliphatic acid amine. Specific examples of these materials include lauric acid, myristic acid, palmitic acid, stearic acid, behenic acid, stearic acid butyl, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

Further, there may be used nonionic surface active agents such as alkylene oxide-based surface active agent, glycerin-based surface active agent, glycidol-based surface active agent and alkylphenol ethylene oxide adduct, cationic surface active agents such as cyclic amine, ester amide, quaternary ammonium salt, hydantoin derivatives, heterocyclic compound, phosphonium and sulfonium, anionic surface active agents containing acidic group such as carboxylic acid, phosphoric acid, sulfuric acid ester group and phosphoric acid ester group, and amphoteric surface active agents such as amino acid, aminosulfonic acid, sulfuric or phosphoric acid ester of aminoalcohol and alkylbetain type surface active agent. For these surface active agents, reference can be made to "Kaimen Kasseizai Binran (Handbook of Surface Active Agent)", Sangyo Tosho K. K. These lubricants, antistatic agents, etc. may not necessarily be pure and may contain impurities such as issomer, unreacted materials, by-reaction products, decomposition products and oxides. The impurity content is preferably not greater than 30% by mass, more preferably not greater than 10% by mass.

These lubricants and surface active agents of the present invention may be used in different kinds and amounts depending on which they are incorporated in the non-magnetic layer or magnetic layer. For example, aliphatic acids having different melting points between a non-magnetic layer and a magnetic layer may be used to control bleeding to the surface of the layer. Esters having different boiling points or polarities between a non-magnetic layer and a magnetic layer may be used to control bleeding to the surface of the layer. By adjusting the amount of the surface active agent, the coating stability may be enhanced. By increasing the amount of the lubricant to be incorporated in the non-magnetic layer, the lubricating effect can be enhanced. It goes without saying that the present invention is not limited thereto. The whole or part of the additives to be used herein may be added at any stage during the preparation of the magnetic layer or undercoat layer coating solution. For example, these additives may be mixed with the ferromagnetic powder before kneading step. Alternatively, these additives may be added at the step of kneading the ferromagnetic powder, binder and solvent. These additives may be added at the dispersion step. These additives may be added after dispersion. These additives may be added directly before coating.

Specific examples of these lubricants employable herein include NAA-102, castor oil hardened aliphatic acid, NAA-42, Cation SA, Nymeen L-201, Nonion E-208, Anon BF, Anone LG, butyl stearate, butyl laurate and erucic acid (produced by NOF CORPORATION), oleic acid (produced by KANTO KAGAKU), FAL-205 and FAL-123 (produced by TAKEMOTO OIL & FAT CO., LTD.), Enujerubu OL (produced by New Japan Chemical Co., Ltd.), TA-3 (produced by Shin-etsu Chemical Co., Ltd.), Armid P (produced by Lion Ahmer Co., Ltd.), Duomin TDO (produced by Lion Corp.), BA-41G (produced by The Nisshin Oil Mills, Co., Ltd.), Profan 2012E, Newpole PE61 and Ionet MS-400 (produced by SANYO CHEMICAL INDUSTRIES, LTD.).

The coating solution prepared from the aforementioned materials is then applied to the support to form an undercoat layer or magnetic layer. In order to prepare the magnetic recording medium of the present invention, the magnetic layer coating solution is applied to the surface of the undercoat layer of the support which is running to a dry thickness of from 0.05 $\mu$m to 2.0 $\mu$m, preferably from 0.07 $\mu$m to 1 $\mu$m. A plurality of magnetic layer coating solutions may be successively or simultaneously applied. Alternatively, the undercoat layer coating solution and the magnetic layer coating solution may be successively or simultaneously applied. Examples of the coating machine for coating the aforementioned magnetic coating solution or undercoat layer coating solution include air doctor coater, blade coater, rod coater, extrusion coater, air knife coater, squeeze coater, dip coater, reverse roll coater, transfer roll coater, gravure coater, kiss coater, cast coater, spray coater, and spin coater. For these coating machines, reference can be made to "Saishin Kotingu Gijutsu (Modern Coating Technique)", Extensive Technologies Service Co., Ltd., May 31, 1983.

In the case where the present invention is applied to a magnetic recording medium having two or more layers, the coating device and method can be proposed as follows:

(1) Using a coating device such as gravure coater, roll coater, blade coater and extrusion coater commonly used the coating of magnetic layer coating solution, an undercoat layer solution is applied. An upper layer is then applied to the undercoat layer while the undercoat layer is wet using a support pressure type extrusion coating device as disclosed in Japanese Patent Publication No. 46186/1989, Japanese Patent Laid-Open No. 238179/1985, and Japanese Patent Laid-Open No. 265672/1990.

(2) Using a coating head having two coating solution passing slits as disclosed in Japanese Patent Laid-Open No.88080/1988, Japanese Patent Laid-Open No. 17971/1990 and Japanese Patent Laid-Open No.265672/1990, an upper layer coating solution and a lower layer coating solution are applied almost simultaneously.

(3) Using an extrusion coating device with backup roll as disclosed in Japanese Patent Laid-Open No. 174965/1990, an upper layer coating solution and a lower layer coating solution are applied almost simultaneously.

The support to be used herein may have a back layer provided on the surface thereof free of magnetic coating solution. The back layer is provided by applying a back layer-forming coating solution having particulate components such as abrasive and antistatic agent and a binder dispersed in an organic solvent to the surface of the support free of magnetic coating solution. As the particulate components there may be used various inorganic pigments or carbon black. As the binders there may be used resins such as nitrocellulose, phenoxy resin, vinyl chloride resin and polyurethane, singly or in admixture. The undercoat layer of the present invention or well-known undercoat layer may be provided on the back layer-forming coating solution surface of the support.

The coat layer formed by the magnetic layer coating solution is dried after magnetic orientation of ferromagnetic powder contained therein. The coat layer thus dried is then subjected to surface smoothing. For the surface smoothing, a supercalender may be used. By subjecting the coat layer to surface smoothing, the pores formed by the removal of solvent during drying can be eliminated to enhance the packing degree of the ferromagnetic powder in the magnetic layer, making it possible to obtain a magnetic recording medium having high electromagnetic characteristics. As the calendering roll there may be used a heat-resistant plastic roll made of epoxy, polyimide, polyamide, polyamideimide or the like. Surface smoothing can be carried out by means of a metallic roll.

The magnetic recording medium of the present invention preferably has a surface smoothness as extremely excellent as from 0.1 nm to 5 nm, preferably from 1 nm to 4 nm in terms of center line average surface roughness (defined in JIS B 0601) at a cutoff value of 0.25 mm for high density recording purpose. In order to accomplish this surface smoothness, the magnetic layer formed by the aforementioned specific ferromagnetic powder and binder can be subjected to calendering as mentioned above. Referring to calendering conditions, the temperature of the calender roll is from 60° C. to 100° C., preferably from 70° C. to 100° C., particularly from 80° C. to 100° C. The calendering pressure is from 100 to 500 Kg/cm (98 to 490 kN/m), preferably from 200 to 450 Kg/cm (196 to 441 kN/m), particularly from 300 to 400 Kg/cm (294 to 392 kN/m). The magnetic recording medium thus obtained can then be slit into a desired size by means of a slitter or the like before use.

EXAMPLE

The present invention will be further described in the following examples, but the present invention is not limited thereto. The term "parts" as used hereinafter is meant to indicate "parts by mass (i.e., parts by weight)".

Example 1

100 parts of a ferromagnetic alloy powder [composition: Fe: 89 atm-%; Co: 5 atm-%; Y: 6 atm-%; Hc: 2,000 Oe (160 kA/m); crystallite size: 15 nm; $S_{BET}$: 59 m$^2$/g; average long axis length: 0.12 $\mu$m; average acicularity ratio: 7; saturation magnetization σs: 150 A·m$^2$/kg] were ground by means of an open kneader for 10 minutes. Subsequently, to the ferromagnetic powder were then added 10 parts (solid content) of an SO$_3$Na-containing polyurethane solution (solid content: 30%; SO$_3$Na content: 70 $\mu$eq/g; mass-average molecular weight: 40,000). To the mixture were then added 30 parts of cyclohexanone. The mixture was then kneaded for 60 minutes.

Subsequently, to the mixture were added the following components:

| Abrasive ($Al_2O_3$: particle size: 0.3 μm) | 2 parts |
| --- | --- |
| Carbon black (particle size: 40 nm) | 2 parts |
| Methyl ethyl ketone/toluene = 1/1 | 200 parts |

The mixture was then subjected to dispersion in a sand mill for 120 minutes. To the dispersion thus obtained were then added the following components:

| Polyisocyanate (Coronate 3041, produced by Nippon Polyurethane Co., Ltd.) (solid content) | 5 parts |
| --- | --- |
| Butyl stearate | 2 parts |
| Stearic acid | 1 part |
| Methyl ethyl ketone | 50 parts |

The mixture was subjected to stirring for 20 minutes, and then filtered through a filter having an average pore diameter of 1 μm to prepare a magnetic coating solution.

Subsequently, a 30 mass-% (i.e., weight %) methyl ethyl ketone solution of the compound set forth in Table 1 was applied to a polyethylene terephthalate support having a thickness of 7 μm by means of a coil bar to obtain a dry thickness of 0.5 μm, dried, and then irradiated with electron ray on the surface of the coat layer at an acceleration voltage of 175 kV with a beam current of 5 mA so that the absorbed dose was 5 Mrad to form an undercoat layer.

Subsequently, a magnetic coating solution was applied to the undercoat layer to obtain a dry thickness of 2.0 μm by means of a reverse roll. The magnetic coating solution thus applied was then subjected to magnetic orientation by means of a Co magnet of 500 mT and a solenoid magnet of 400 mT while it was wet. The material thus coated was subjected to calendering through seven metallic rolls (rate: 100 m/min, linear pressure: 300 Kg/cm (294 kN/m); temperature: 90° C.), and then slit into a width of 3.8 mm.

Examples 2–6 and Comparative Examples 1–2

Magnetic recording media were prepared from the compounds and supports set forth in Table 1 in the same manner as in Example 1.

Example 7

As an upper magnetic coating solution there was used the same magnetic coating solution as used in Example 1.
Preparation of Lower Non-magnetic Coating Solution 100 parts of α-$Fe_2O_3$ (average long axis length: 0.15 μm; $S_{BET}$: 52 m$^2$/g; surface-treated layer: $Al_2O_3$, $SiO_2$; pH 6.5–8.0) were ground by means of an open kneader for 10 minutes. Subsequently, to the material thus ground were added 7.5 parts of a compound ($SO_3Na=6\times10^{-5}$ eq/g, epoxy=$10^{-3}$ eq/g, Mw: 30,000) obtained by adding a hydroxyethyl sulfonate sodium salt to a 86/9/5 copolymer of vinyl chloride, vinyl acetate and glycidyl methacrylate and 10 parts (solid content) of an $SO_3Na$-containing polyurethane solution (solid content: 30%; $SO_3Na$ content: 70 μeq/g; mass-average molecular weight: 40,000). To the mixture were then added 30 parts of cyclohexanone. The mixture was then kneaded for 60 minutes.

Subsequently, to the mixture were then added the following components:

Methyl ethyl ketone/toluene=1/1 200 parts

The mixture was then subjected to dispersion in a sand mill for 120 minutes. To the dispersion thus obtained were then added the following components:

| Polyisocyanate (Coronate 3041, produced by Nippon Polyurethane Co., Ltd.) (solid content) | 5 parts |
| --- | --- |
| Butyl stearate | 2 parts |
| Stearic acid | 1 part |
| Methyl ethyl ketone | 50 parts |

The mixture was subjected to stirring for 20 minutes, and then filtered through a filter having an average pore diameter of 1 μm to prepare a magnetic coating solution.

Subsequently, a 30 mass-% methyl ethyl ketone solution of the compound set forth in Table 1 was applied to a polyethylene terephthalate support having a thickness of 7 μm by means of a coil bar to obtain a dry thickness of 0.5 μm, dried, and then irradiated with electron ray on the surface of the coat layer at an acceleration voltage of 175 kV with a beam current of 5 mA so that the absorbed dose was 5 Mrad to form an undercoat layer.

Subsequently, a magnetic coating solution was applied to the undercoat layer to obtain a dry thickness of 1.5 μm by means of a reverse roll. An upper magnetic coating solution was simultaneously applied to the magnetic layer to obtain a dry thickness of 0.05 μm by means of a reverse roll. The support thus coated with a magnetic coating solution was then subjected to magnetic orientation by means of a Co magnet of 500 mT and a solenoid magnet of 400 mT while it was wet. The material thus coated was subjected to calendering through seven metallic rolls (rate: 100 m/min, linear pressure: 300 Kg/cm (294 kN/m); temperature: 90° C.), and then slit into a width of 3.8 mm.

Comparative Example 3

A magnetic recording medium was prepared in the same manner as in Example 7 except that the compounds set forth in Table 1 were used.

The samples thus obtained were each then evaluated in the following manner.

Measuring Methods (i) Undercoat Layer Tg

Using a dynamic viscoelasticity meter RHEOVIBRON (produced by A&D Co., Ltd.), the sample was measured for loss elastic modulus at a frequency of 110 Hz and a temperature rising rate of 2° C./min. Tg was then determined from the peak temperature of loss elastic modulus.

(ii) Number of Fine Protrusions (PN)

Using a Type Nanoscope III atomic force microscope (AFM) (produced by Digital Instrument Co., Ltd.), the sample was measured for number of protrusions having a height up to 20 nm every 5 nm in an area of 10 μm square (100 μm$^2$) with an SiN probe in the form of quadrangular pyramid having a sharpness of 70°. The number of protrusions having a height of from 10 nm to 20 nm was determined by the method mentioned above.

(iii) Electromagnetic Characteristics (Output)

Using a DDS4 drive, a 4.7 MHz single frequency signal was recorded on the sample with an optimum recording current. The reproduced output was then measured. The electromagnetic characteristics were then represented by this reproduced output relative to that of Comparative Example 1 as 0.0 dB.

(iv) Peel Strength (N)

A double-sided adhesive tape (SPLICING TAPE, produced by 3M Co., Ltd.) was stuck to a glass plate. The sample tape was then stuck to the other adhesive side of the double-sided adhesive tape in such an arrangement that the longitudinal end extended on the adhesive tape over 10 mm. The other end of the sample tape was then pulled at an angle of 180°. The force required to peel the sample tape off the adhesive tape was then measured to determine the peel strength (N) of the sample.

(v) Number of Dropouts

Using a dropout counter, the sample was measured while being allowed to run by means of DDS4 drive at a temperature of 23° C. and 70% RH for 1 minute. Those showing a drop of −5 dB from the initial output for 5 seconds and more were defined as dropout. The number of these dropouts was measured.

(vi) Adhesion

The sample which had been coated with an undercoat layer was visually examined for adhesion to pass roll.

Those showing adhesion to pass roll were judged defective.

Those showing no adhesion to pass roll were judged acceptable.

(ii) The peel strength of the magnetic layer can be enhanced to lessen dropouts.

(iii) No adhesion was observed after coating of undercoat layer.

The entitle disclosure of each and every foreign patent application from which the benefit of foreign priority has been claimed in the present application is incorporated herein by reference, as if fully set forth herein.

While the present invention has been described in detail and with reference to specific embodiments thereof, it will be apparent to one skilled in the art that various changes and modifications can be made therein without departing from the spirit and scope thereof.

What is claimed is:

1. A magnetic recording medium comprising an undercoat layer formed by a radiation-curing resin provided on a support and at least magnetic layer containing a ferromagnetic powder and a binder provided thereon, wherein the radiation-curing resin is a compound having an alicyclic structure and two or more radiation-curing functional groups per molecule, the undercoat layer is a radiation-cured layer, the magnetic layer has a thickness of from 0.05 $\mu$m to 2.0 $\mu$m and the number of protrusions having a height of from 10 nm to 20 nm as measured by an atomic force microscope (AFM) is from 5 to 1,000 per 100 $\mu m^2$ of the surface of the magnetic layer.

TABLE 1

|  | | Undercoat layer | | Thickness of magnetic layer | Magnetic layer PN/ | Output | Peel strength | Number of | |
| --- | --- | --- | --- | --- | --- | --- | --- | --- | --- |
|  | Support | Compound | Tg | $\mu$m | $\mu m^2$ | dB | N | dropouts | Adhesion |
| Example 1 | PET | Dimethyl tricyclodecane diacrylate | 120° C. | 2.0 | 21 | 1.5 | 1.76 | 15 | None |
| Example 2 | PEN | Dimethyl tricyclodecane diacrylate | 120° C. | 2.0 | 38 | 1.4 | 1.76 | 18 | None |
| Example 3 | Poly-amide | Dimethyl tricyclodecane diacrylate | 120° C. | 2.0 | 125 | 1.4 | 1.67 | 20 | None |
| Example 4 | PET | Dimethylbicyclooctane diacrylate | 110° C. | 2.0 | 850 | 1.3 | 1.67 | 23 | None |
| Example 5 | PET | Dimethyl cyclohexane diacrylate | 100° C. | 2.0 | 740 | 1.5 | 1.76 | 25 | None |
| Example 6 | PET | Spiroglycol diacrylate | 130° C. | 2.0 | 125 | 1.5 | 1.86 | 25 | None |
| Example 7 | PET | Dimethyl tricyclodecane diacrylate | 120° C. | 0.05 | 7 | 1.5 | 1.67 | 24 | None |
| Comparative Example 1 | PET | Diethylene glycol diacrylate | 40° C. | 2.0 | 258 | 0.0 | 1.67 | 54 | Observed |
| Comparative Example 2 | PET | Dimethyl tricyclodecane diacrylate | 120° C. | 2.3 | 1,080 | −0.8 | 1.71 | 70 | None |
| Comparative Example 3 | PET | Diethylene glycol diacrylate | 40° C. | 0.05 | 1,140 | −0.8 | 1.62 | 55 | Observed |

As can be seen in the results shown in Table 1, the samples of the present invention exhibit a higher output and less DO than the comparative samples. Further, the samples of the present invention exhibit secured peel strength and no adhesion.

In accordance with the present invention, a hardened layer comprising a compound having an alicyclic structure and two or more radiation-curing functional groups in the molecule is provided on a support. A magnetic layer having a thickness of from 0.05 $\mu$m to 2.0 $\mu$m and from 5 to 1,000 fine protrusions having a height of from 10 nm to 20 nm per 100 $\mu m^2$ is then provided on the hardened layer. In this arrangement, a magnetic recording medium having the following effects can be provided:

(i) The surface of the magnetic coat layer can be smoothened to improve the electromagnetic characteristics of the magnetic recording medium.

2. The magnetic recording medium as in claim 1, wherein the alicyclic structure is one formed by a plurality of rings having atoms in common.

3. The magnetic recording medium as in claim 1, wherein the radiation-curing resins are acrylic acid esters and methacrylic acid esters.

4. The magnetic recording medium as in claim 1, wherein the radiation-curing resins are acrylic acid esters having two acryloyl groups.

5. The magnetic recording medium as in claim 1, wherein the radiation-curing resin has an alicyclic structure.

6. The magnetic recording medium as in claim 1, wherein the radiation-curing resin has an alicyclic structure having a bicyclo skeleton, a tricyclo skeleton, a spiro skeleton or a dispiro skeleton.

7. The magnetic recording medium as in claim 1, wherein the radiation-curing resins are dimethyloltricyclodecane diacrylate, dimethylolbicyclooctane diacrylate, or dimethylolspirooctane diacrylate.

8. The magnetic recording medium as in claim 1, wherein the undercoat layer cured has a glass transition temperature Tg of from 80° C. to 150° C.

9. The magnetic recording medium as in claim 1, wherein the undercoat layer cured has a glass transition temperature Tg of from 100° C. to 130° C.

10. The magnetic recording medium as in claim 1, wherein the undercoat layer has a thickness of from 0.1 µm to 1.0 µm.

11. The magnetic recording medium as in claim 1, wherein the undercoat layer has a thickness of from 0.5 µm to 0.7 µm.

12. The magnetic recording medium as in claim 1, wherein the magnetic layer has a dry thickness of from 0.05 µm to 2.0 µm.

13. The magnetic recording medium as in claim 1, wherein the magnetic layer has a dry thickness of from 0.07 µm to 1 µm.

* * * * *